(12) United States Patent
Baseflug et al.

(10) Patent No.: US 7,628,700 B2
(45) Date of Patent: Dec. 8, 2009

(54) GAME CONTROLLER LINK MECHANISM JOINING A USER-ACTIVATED CONTROL AND AN ANALOGUE INPUT DEVICE

(75) Inventors: Michael W. Baseflug, Duvall, WA (US);
Daniel J. Blase, Everett, WA (US);
Brigitta M. Suwandana, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 682 days.

(21) Appl. No.: 11/106,272

(22) Filed: Apr. 13, 2005

(65) Prior Publication Data
US 2006/0234794 A1    Oct. 19, 2006

(51) Int. Cl.
*A63F 9/22*   (2006.01)
(52) U.S. Cl. .......................................... 463/36; 463/38
(58) Field of Classification Search ...................... 463/1, 463/36–39
See application file for complete search history.

(56) References Cited

U.S. PATENT DOCUMENTS

| | | | | |
|---|---|---|---|---|
| 2,945,486 A | * | 7/1960 | Webby | 124/73 |
| 3,308,675 A | * | 3/1967 | Jonsson | 74/471 R |
| 3,877,169 A | * | 4/1975 | Munday et al. | 446/430 |
| 5,158,292 A | * | 10/1992 | Hanchar | 273/121 A |
| 5,190,203 A | * | 3/1993 | Rodak | 227/175.1 |
| 5,643,087 A | * | 7/1997 | Marcus et al. | 463/38 |
| 6,007,428 A | * | 12/1999 | Nishiumi et al. | 463/36 |
| 7,176,892 B2 | * | 2/2007 | Kobayashi | 345/161 |
| 2003/0139213 A1 | * | 7/2003 | Sobota | 463/37 |

* cited by examiner

*Primary Examiner*—Peter DungBa Vo
*Assistant Examiner*—Masud Ahmed
(74) *Attorney, Agent, or Firm*—Woodcock Washburn LLP

(57) ABSTRACT

A link mechanism of a game controller connecting a user-activated control to an analogue input device located a distance away. The link mechanism is adapted to provide linear or near linear rotational characteristics between the user-activated control and the analogue input device. The link mechanism can be curved, or curved over a portion of its length. Or, a slot disposed in the link mechanism to slidably engage a post of the user-activated control can be curved to facilitate desired linearity. Or, the slot can be angled. Or, the slot can be aligned so that its longitudinal axis does not intersect a pivot point of the analogue input device. Or, a distance between a pivot point of the user-activated control and the post can equal a distance between the post and a rotational pivot point of the analogue input device. Or, any combination of the above characteristics could be employed.

13 Claims, 12 Drawing Sheets

GAME CONTROLLER LINK MECHANISM JOINING A USER-ACTIVATED CONTROL AND AN ANALOGUE INPUT DEVICE

FIELD OF THE INVENTION

The present invention relates to video game controllers, and more specifically to a link mechanism within the game controller that interacts between a user-activated control and an analogue input device.

BACKGROUND OF THE INVENTION

Video game controllers often provide a lever or trigger to operate an analogue input device, such as a potentiometer. Ideally, a pivot point or rotational axis of the lever or trigger is attached concentric to a rotatable shaft of the potentiometer, providing that an angle of movement of the trigger is equal to an angle of movement of the potentiometer's rotatable shaft. This provides a linearity between user action and game response, and contributes to user satisfaction with the game.

Constraints on game controller design, concerning size, shape and usage characteristics, can preclude concentric attachment of user-activated control to analogue input device. The same constraints, along with cost and reliability concerns, can preclude use of gears or pulleys between the trigger and the input device; gears and pulleys that, if similarly sized, could also provide a linearity of user action to game response.

Accordingly, what is needed is a link mechanism that joins a user-activated control to an analogue input device located a distance away, a link mechanism suitably shaped to cooperate and conform with current constraints on game controller design, and one adapted to provide linear or near linear rotational characteristics between the user-activated control and the analogue input device.

SUMMARY OF THE INVENTION

The present invention provides a link mechanism responsible for the interaction between a user-activated control, such as a trigger or lever, and an associated analogue input device, such as a potentiometer. The curvature and various component configurations of the link mechanism of the present invention provide a high degree of linearity between a rotation angle of a trigger and a resulting rotation angle of the input device located a distance away. Accordingly, when linearity exists, every 10 of trigger movement results in 10 of potentiometer axle rotation. The curvature and various component configurations of the link mechanism of the present invention also contribute to achieving optimal performance while conforming to the size, space and usage constraints of current video game controllers.

Various component configurations of the link mechanism of the present invention provide a linear, or near linear, relationship between user action and game response, and contribute to maximizing user satisfaction with the game. The various configurations can be selectively implemented to optimize desired linearity based upon design constraints of the game controller. Some of the constraints can include a vertical offset VO and horizontal offset HO existing between a trigger pivot point and a link mechanism pivot point (or potentiometer axle). Other constraints can be a link distance LD, defined as a straight line distance between the link mechanism pivot point (or potentiometer axle) and a link mechanism/trigger joint, and a trigger distance TD, defined as a straight line distance between the link mechanism/trigger joint and a trigger pivot point.

In one aspect of the present invention, the link mechanism includes a length, where the length is curved over its entire length, or is curved over a portion of its length, so that link distance LD equals trigger distance TD. Where link distance LD equals trigger distance TD, linearity exists between trigger rotation angle and potentiometer rotation angle.

Where controller constraints preclude link distance LD equaling trigger distance TD, other aspects of the invention include curvature of the link mechanism and manipulation of a slot configuration within the link mechanism to achieve linearity or near linearity between user-activated control action and game response. For instance, partial curvature of the slot, or consistent curvature of the slot about a radius can facilitate desired linearity or near linearity of rotation. If the slot is curved about a radius, the radius can be centered above or below the linkage mechanism.

In other aspects of the invention, the slot is angled; that is, an angle other than 0° exists between a longitudinal axis of the slot, otherwise described as a line through center-points of ends of the slot, and any line parallel to a line intersecting the rotational pivot point of the analogue input device and forming a 90° angle with a line intersecting the rotational pivot point of the user-activated control 16. An angled slot also facilitates linearity or near linearity of rotation. Further, the slot can be disposed so that a line defined by a longitudinal axis of the slot does not intersect the rotational pivot point of the analogue input device.

In another slotted angle aspect of the invention, the angle between the longitudinal axis of the slot and any line parallel to a line intersecting the rotational pivot point of the analogue input device and forming a 90° angle with a line intersecting the rotational pivot point of the user-activated control equals an angle between the line intersecting the rotational pivot point of the analogue input device and forming a 90° angle with a line intersecting the rotational pivot point of the user-activated control and a line intersecting the rotational pivot point of the user-activated control and the rotational pivot point of the analogue input device.

In another aspect of the invention, the slot can be both angled and curved, each as described above, and each in any of various degrees, to achieve linearity or near linearity of rotation. Further aspects also include configurations where the user-activated control pivot point is vertically offset from a rotational pivot point of the analogue input device, and/or link mechanism/trigger joint is vertically offset from each of the user-activated control pivot point and the rotational pivot point of the analogue input device. Still further aspects include any combination of the various component configurations described above.

Accordingly, the link mechanism of the present invention can be implemented within a game controller having a user-activated control, such as a trigger or lever, rotatably fixed about a user-activated control pivot point, an analogue input device, such as a potentiometer, and the link mechanism, communicating user-activated control movement to operation of the analogue input device.

BRIEF DESCRIPTION OF THE DRAWINGS

For the purpose of illustrating the embodiments of the present invention, there is shown in the drawings forms presently preferred; it being understood, however, that the present invention is not limited to the precise arrangements and instrumentalities shown.

DETAILED DESCRIPTION OF ILLUSTRATIVE EMBODIMENTS

Figure 1:
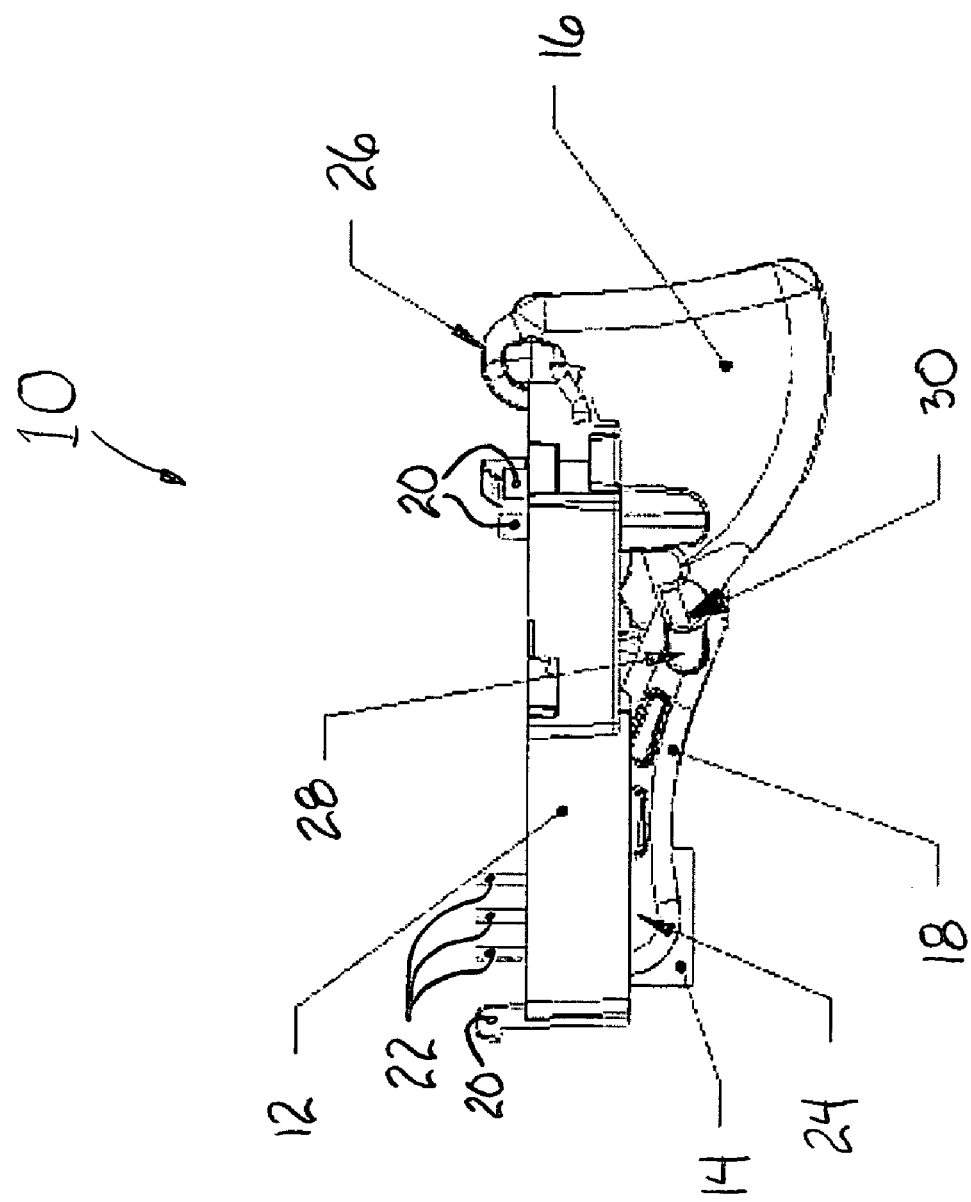
FIG. 1 illustrates a side view of a portion of a game controller including a link mechanism in accordance with one embodiment of the present invention.
Figure 2:
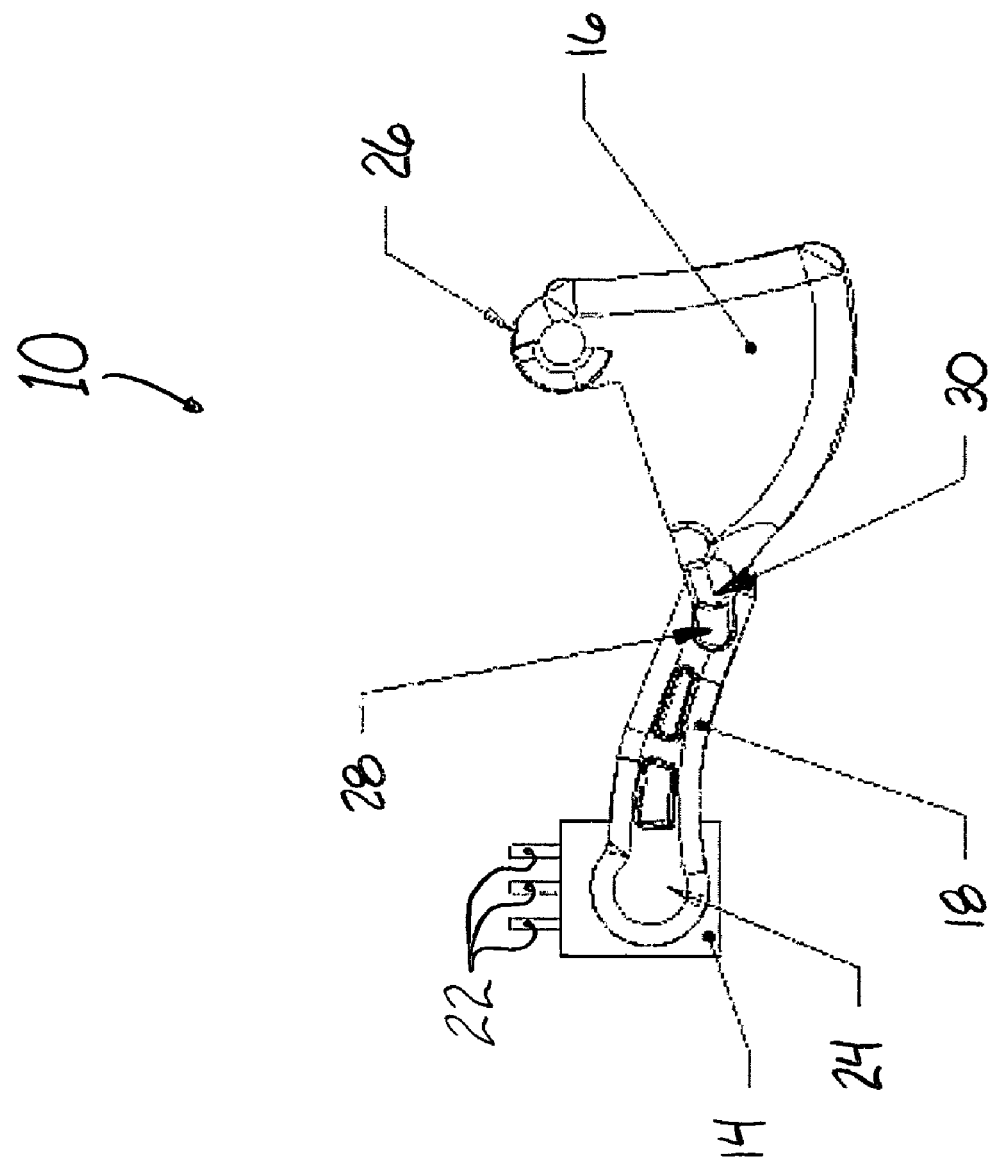
FIG. 2 illustrates a side view of a portion of the game controller of FIG. 1 with a mount device removed, thereby better showing the link mechanism of FIG. 1.

Referring now to the drawings, wherein like numerals indicate like elements, there is shown in FIGS. 1-4 a portion of a game controller 10 according to one embodiment of the invention. The game controller 10 includes a mount 12, an analogue input device 14, such as a potentiometer, and a user-activated control 16, such as a trigger or lever, and a link mechanism 18.

The mount 12 attaches to a circuit board (not shown) using clips 20. The analog input device 14 is fixed to the mount 12 and electrically communicates with the circuit board using connectivity pins 22. The link mechanism 18 is fixed to a rotatable operational controller 24 of the analogue input device 14. The rotatable operational controller 24 can be a stem or axle of a potentiometer 14, and may be referred to herein as a potentiometer shaft or stem, or as a link mechanism pivot point 24. The user-activated control 16, or trigger, is rotatably connected to the mount 12 by a hinge-type configuration at a trigger pivot point 26.

A post 30 extends transversely from a plane of the trigger 16 and is contained within a slot 28 of the link mechanism 18. The post 30 slidably translates within the slot 28 during activation of the trigger 16. Accordingly, the post 30 may also be referred to as the link/trigger joint 30. It is understood that other embodiments of the invention could include a slot 28 disposed within the trigger 16, with a post 30 extending from the link mechanism 18.

In FIGS. 1-4, the trigger 16 is shown in a spring-biased, disengaged position (or initial position). The trigger 16 is user-activated by a clockwise rotation (clockwise in relation to the view shown in FIGS. 1-4) of the trigger 16 about the trigger pivot point 26. The sliding translation of the post 30 within the slot 28 during clockwise rotation of the trigger 16 causes the link mechanism 18 to rotate counter-clockwise about the link mechanism pivot point 24, consequently causing a counter-clockwise rotation of the potentiometer axle 24.

Ideally, an angle of movement of the trigger 16 about the trigger pivot point 26 is equal to the angle of movement of the potentiometer axle 24. This ideal rotational linearity optimizes a relationship between user action and game response, and contributes to maximizing user satisfaction with the game. Characteristics of the link mechanism 18, implemented through various embodiments of the present invention, provides linearity, or near linearity, between the rotation angle of the trigger 16 and the rotation angle of the potentiometer 14.

Figure 3:
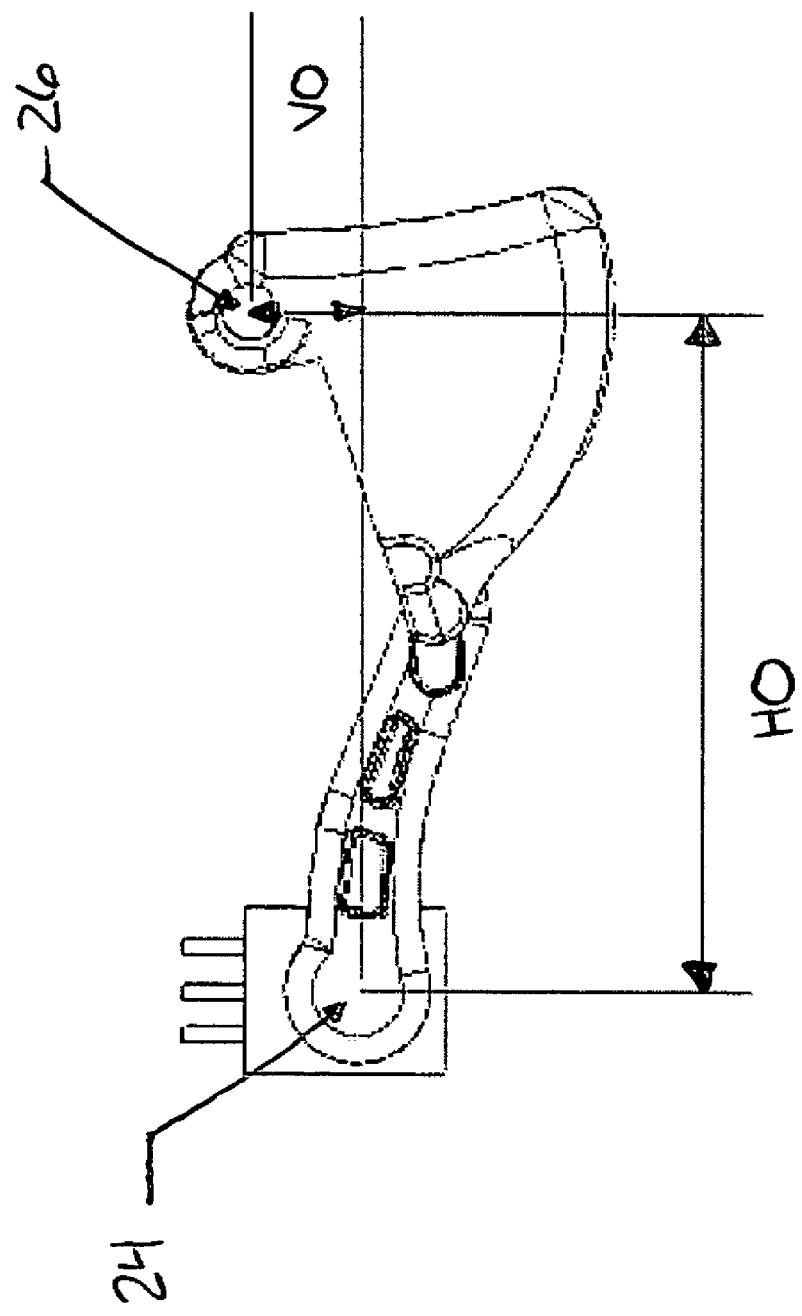
FIG. 3 illustrates the side view of the portion of the game controller of FIG. 2, detailing a vertical and horizontal offset between a rotational axis of an analogue input device and a rotation axis of a user-activated control.

Referring now to FIG. 3, a vertical offset VO and horizontal offset HO are shown between the trigger pivot point 26 and the link mechanism pivot point (or potentiometer axle) 24. The offset dimensions are factors determinative of link mechanism 24 characteristics necessary to provide linearity between trigger rotation angle and potentiometer rotation angle.

Figure 4:
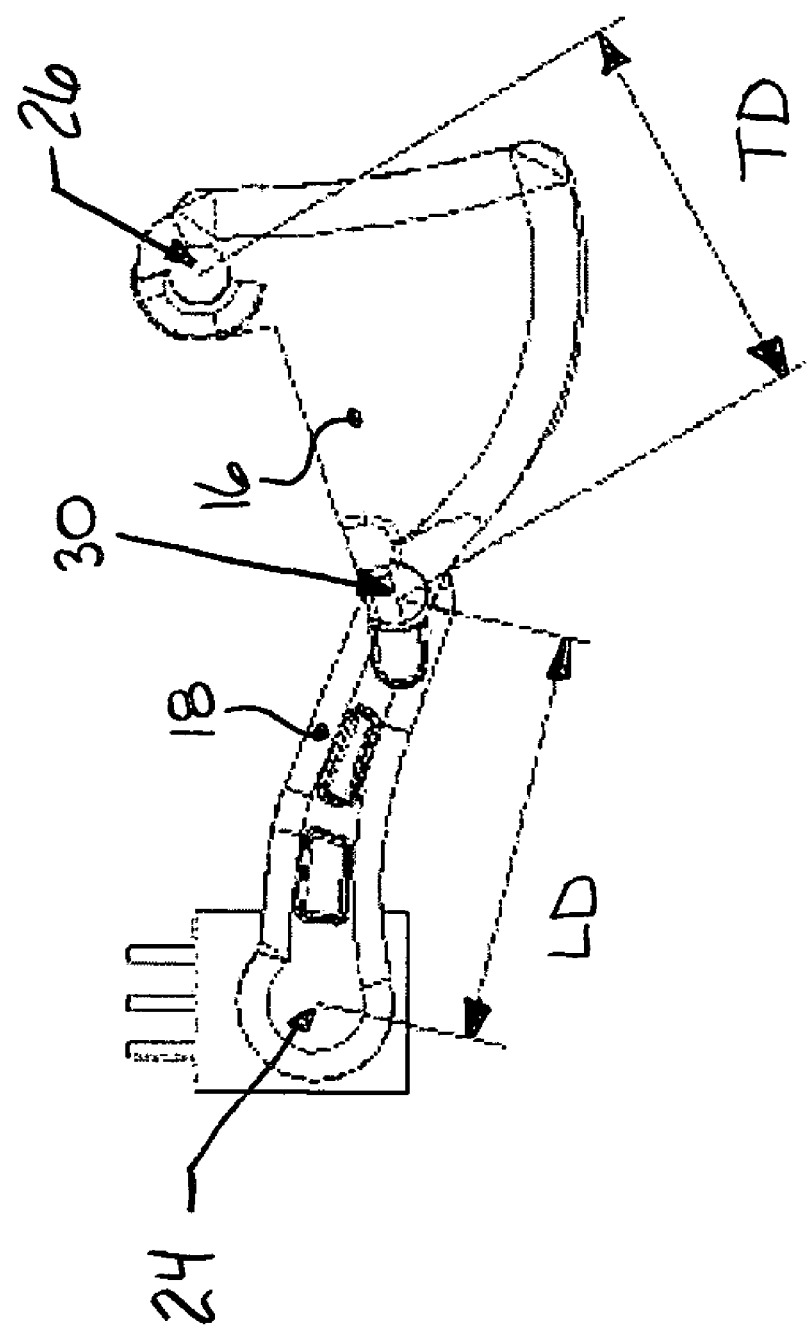
FIG. 4 illustrates the side view of the portion of the game controller of FIG. 2, detailing a relationship between a link mechanism length and a user-activated control length.

FIG. 4 illustrates a link distance LD and a trigger distance TD associated with the game controller 10. The link distance LD is defined as a straight line distance between the link mechanism pivot point 24 and the post, or link/trigger joint 30. The trigger distance TD is defined as a straight line distance between the link/trigger joint 30 and the trigger pivot point 26. In one embodiment of the invention, the link distance LD is equal to the trigger distance TD. Where link distance LD equals trigger distance TD, linearity exists between the trigger rotation angle and the potentiometer rotation angle. Accordingly, in this embodiment, every 1° of trigger 16 movement results in 1° of potentiometer axle 24 rotation.

In order to provide a relationship between the trigger 16 and the link mechanism 18 so that the link distance LD equals the trigger distance TD, the link mechanism 18 can be curved over an entirety of, or over a portion of, its length. A curved link mechanism also provides that a length of the slot 28 need not be as long as that required with a straight link mechanism. Dimensions of the vertical offset VO and the horizontal offset HO, as selected by designers and/or dictated by physical constraints of the game controller 10, determine the optimal curvature of the link mechanism 18 necessary to achieve linearity, or near linearity, and determine whether the link mechanism 18 should be curved over an entirety of, or over only a portion of, its length. However, it is understood that, although not illustrated in the various figures, link embodiments of the present invention could include straight link mechanisms 18 employing features of the invention detailed below.

Figure 5:
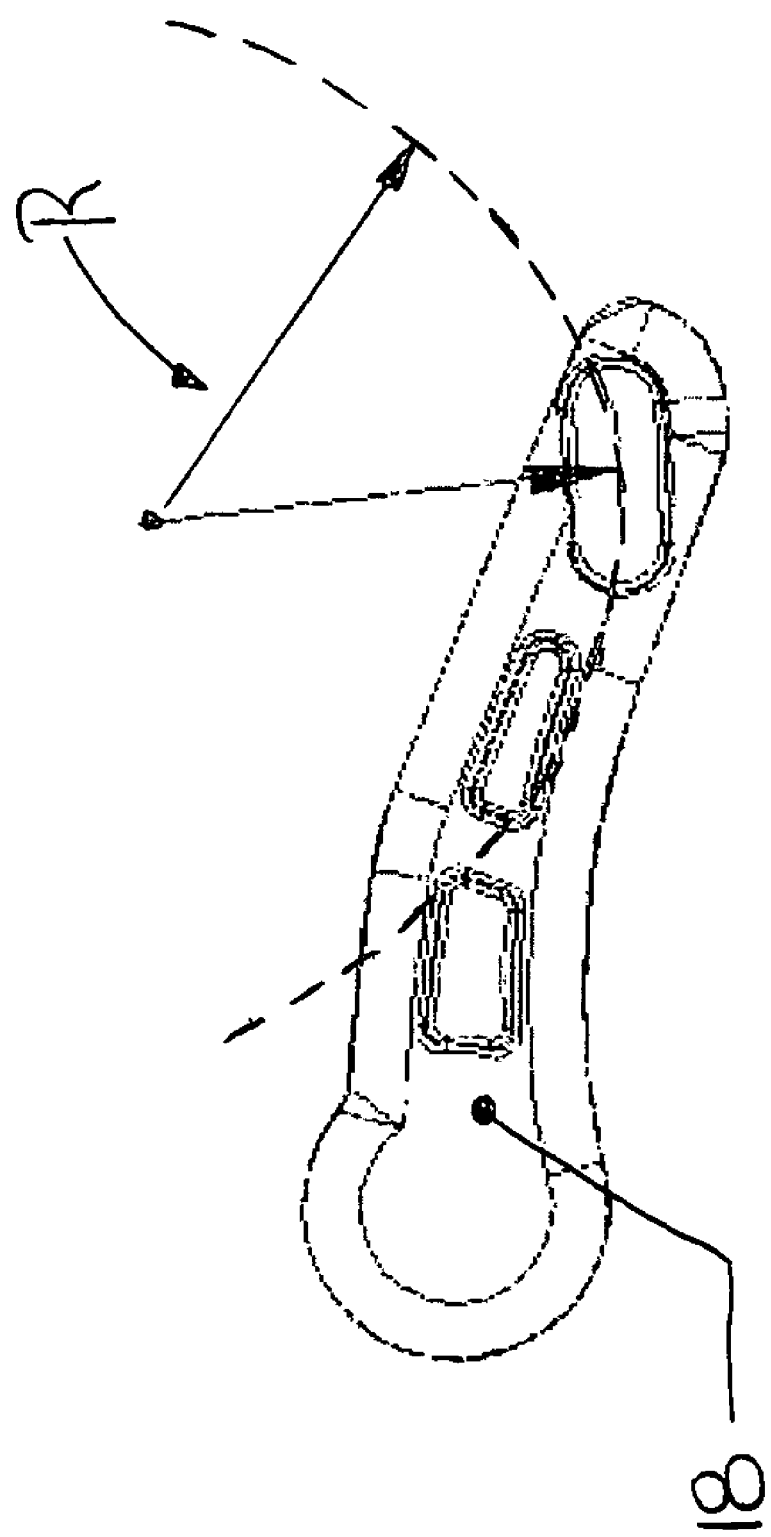
FIG. 5 illustrates another embodiment of a link mechanism of the present invention, detailing a radius of curvature of a slot within the link mechanism.

FIG. 5 illustrates another link mechanism 18 embodiment of the invention. In FIG. 5, only the link mechanism 18 is shown so that the entire slot 28 (without the post 30 slidably inserted therein) can be viewed. In this link mechanism 18 embodiment, the slot 28 is curved, following a radius of curvature over its entire length. In other embodiments, the slot 28 is curved over only a portion of its length, or the curvature is elliptical, or of any other shape, or the slot curvature possesses a combination of shapes over a portion of, or over an entirety of, its length. Curving the slot 28 provides an interaction between the trigger 16 and link mechanism 18 allowing a higher degree of linearity between trigger rotation angle and potentiometer rotation angle during game play. Curving the slot 28, to provide a higher degree of linearity, is beneficial when physical constraints of the game controller preclude a design having link distance LD equaling trigger distance TD. An optimal radius of curvature would depend on link distance LD, trigger distance TD, vertical offset VO and horizontal offset HO. Further, the center of the radius of curvature could be located above or below the slot 28. In the FIG. 5 embodiment, the radius of curvature is 40 mm, and the center of the radius is above the slot 28 (as viewed in FIG. 5).

Figure 6:
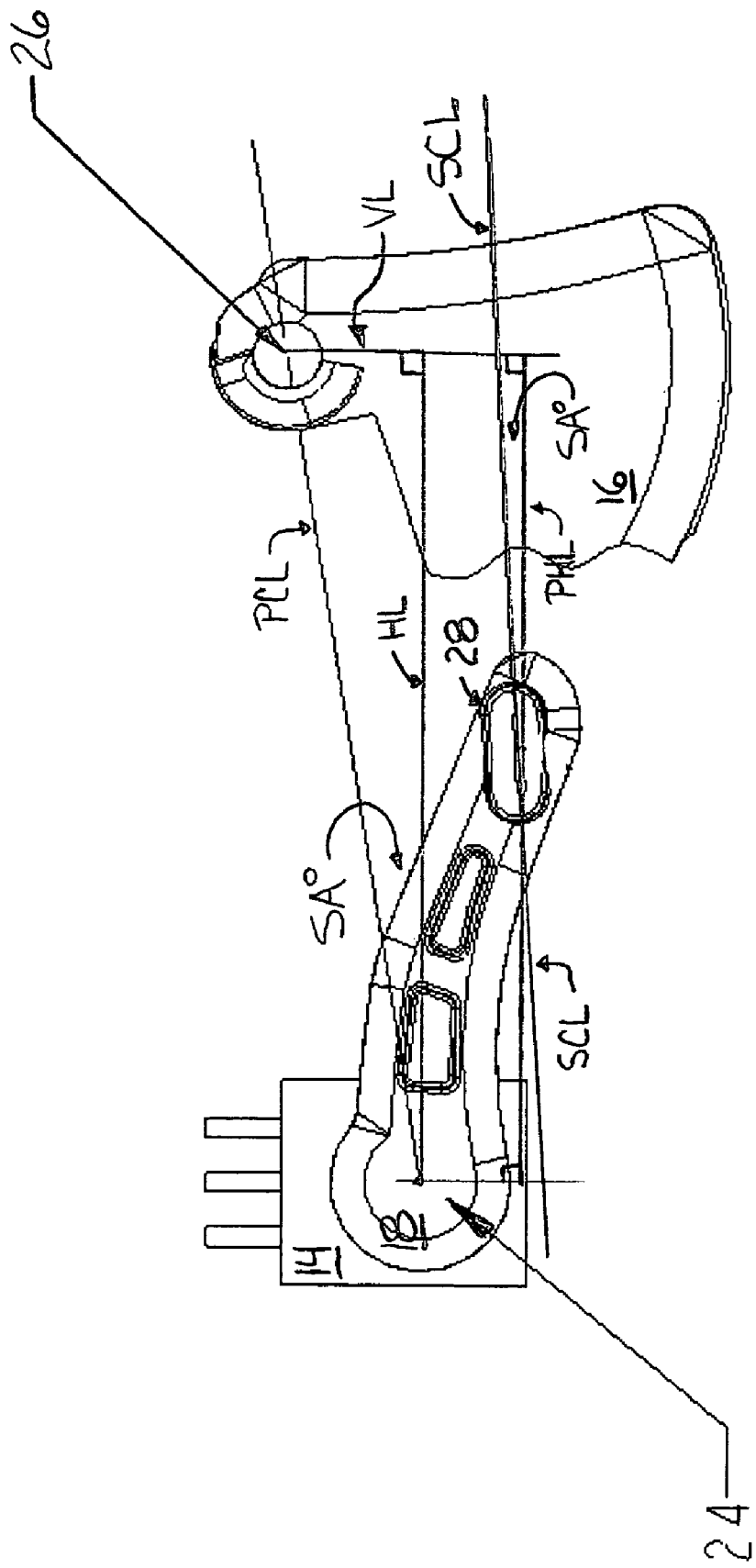
FIG. 6 illustrates still another embodiment of a link mechanism of the present invention, detailing an angled offset of a slot within the link mechanism.

FIG. 6 illustrates another link mechanism 18 embodiment of the invention, where the slot 28 is angled relative to horizontal; that is, an angle other than 0° exists between a longitudinal axis of the slot 28, otherwise described as a line through center-points of ends of the slot 28 (shown as slot center line SCL), and any line parallel to (shown as parallel horizontal line PHL) a line intersecting the rotational pivot point 24 of the analogue input device 14 (shown as horizontal line HL) and forming a 90° angle with a line intersecting the rotational pivot point 26 of the user-activated control 16 (shown as vertical line VL).

Further, the line through slot end center-points (slot center line SCL) also does not intersect the link mechanism pivot point 24. Angling the slot 28 as described also provides interaction between the trigger 16 and the link mechanism 18 facilitating a higher degree of linearity between trigger rotation angle and potentiometer rotation angle. A slot angle SA° optimizing linearity would again depend upon link distance LD, trigger distance TD, vertical offset VO and horizontal offset HO, as selected by designers and/or dictated by physical constraints of the game controller 10. In various embodiments of the invention, the slot 28 could be angled above or below horizontal (i.e., parallel horizontal line PHL). In the FIG. 6 embodiment, the slot is angled above horizontal, and the angle SA° of the slot 28 is 2.5°. Typical angles might range between 0.5° and 10°.

In a more specific embodiment of the invention shown in FIG. 6, the angle between the longitudinal axis of the slot 28 (slot center line SCL) and any line parallel to a line intersecting the rotational pivot point 24 of the analogue input device 14 and forming a 90° angle with a line intersecting the rotational pivot point 26 of the user-activated control 16 (again, shown as parallel horizontal line PHL) equals an angle between the line intersecting the rotational pivot point 24 of the analogue input device 14 and forming a 90° angle with a line intersecting the rotational pivot point of the user-activated control (horizontal line HL) and a line intersecting the rotational pivot point of the user-activated control and the rotational pivot point of the analogue input device (shown as pivot center line PCL). In this specific embodiment, the various locations identified as slot angle SA° include angle values.

Optimizing linearity between trigger rotation angle and potentiometer rotation angle might be found when the slot is angled and curved. In the specific link mechanism 18 embodiment shown in FIGS. 1-4, the slot 28 is both angled and curved, having a radius of curvature of 40 mm, with center located above the slot 28, and having a slot angle of 2.5° above horizontal.

Where physical constraints of the game controller preclude link distance LD equaling trigger distance TD, the curved link mechanism 18 embodiments, curved slot 28 embodiments and/or angled slot 28 embodiments of the present invention provide a higher degree of linearity between user action and game response than a straight link mechanism having a straight and un-angled slot, as the following will illustrate.

Figure 7:
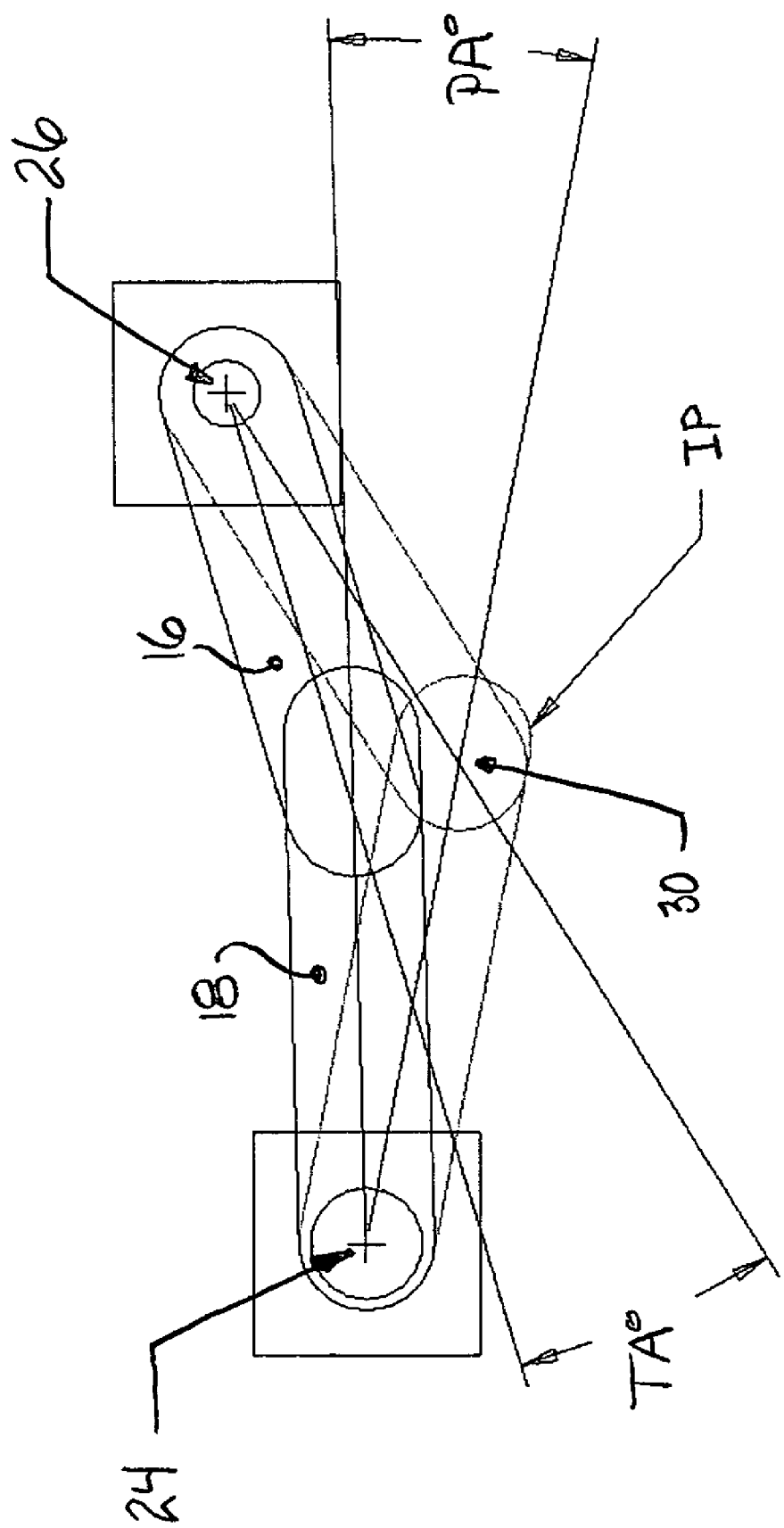
FIG. 7 illustrates a relationship between trigger rotation angle TA° and potentiometer rotation angle PA° of an example straight link mechanism.

FIG. 7 illustrates a relationship between trigger rotation angle TA° and potentiometer rotation angle PA° when a straight link mechanism 18 is used, one having a straight, un-angled slot 28, and one where a line through the slot end center-points (slot center line CL) intersects the link mechanism pivot point 24. In FIG. 7, an initial position IP of the components, where the trigger 16 is spring-biased in a disengaged position, is shown in lighter print. As the trigger 16 is engaged and rotated clockwise about the trigger pivot point 26, increments of trigger rotation angle TA° are recorded versus resulting potentiometer rotation angle PA°. The resulting potentiometer rotation angle PA° is caused by interaction between the trigger 16 and the link mechanism 18; and more particularly by the slidable interaction of the post 30 within the slot 28.

Table 1 charts the relationship of incremental trigger rotation angle TA° versus resulting potentiometer rotation angle PA° for the example shown in FIG. 7. In this straight link mechanism example, having a straight, un-angled slot, the initial link distance LD is 19.56 mm (i.e., link distance prior to trigger engagement and rotation), the horizontal offset HO is 38.30 mm, the vertical offset VO is 6.04 mm, and the link distance LD is not equal to the trigger distance TD. Table 1 shows that for every 0.5° increment of trigger rotation angle TA°, the resulting increment of potentiometer rotation angle PA° ranges between 0.33° and 0.51°.

Figure 9:
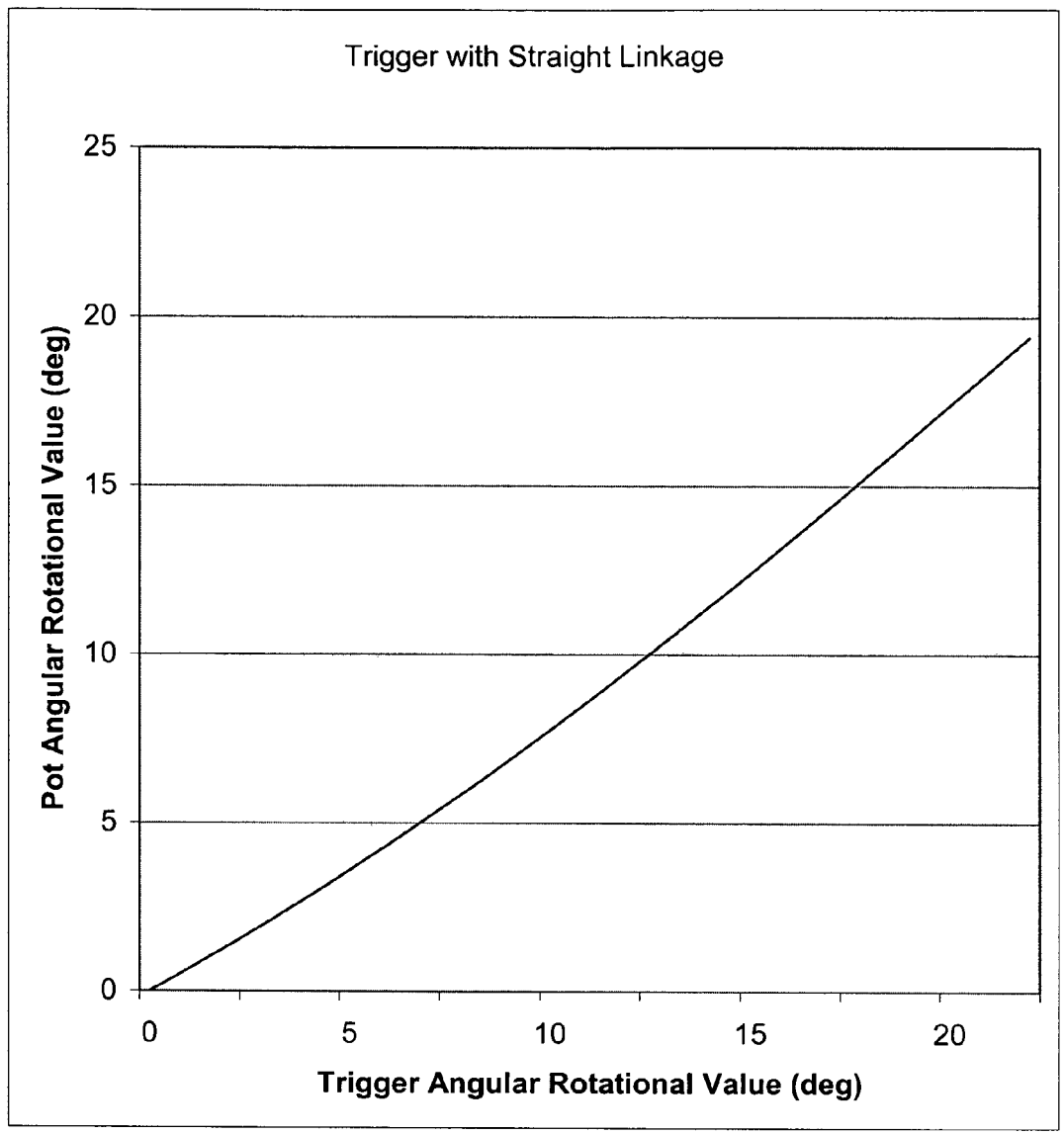
FIG. 9 graphs total potentiometer rotation angle PA°, for the straight link mechanism configuration of FIG. 7, relative to total trigger rotation angle TA°.

Table 1 illustrates that the straight linkage configuration of FIG. 7 introduces an angular discrepancy error of +/−11.5% between trigger rotation angle TA° and potentiometer rotation angle PA°. Accordingly, the resulting relationship between user input (when a user depresses the trigger) and game response (angular movement of the potentiometer axle) is non-linear, as illustrated in FIG. 9. For instance, a 22° turn of the trigger produces a 19.4° turn of the potentiometer.

Figure 8:
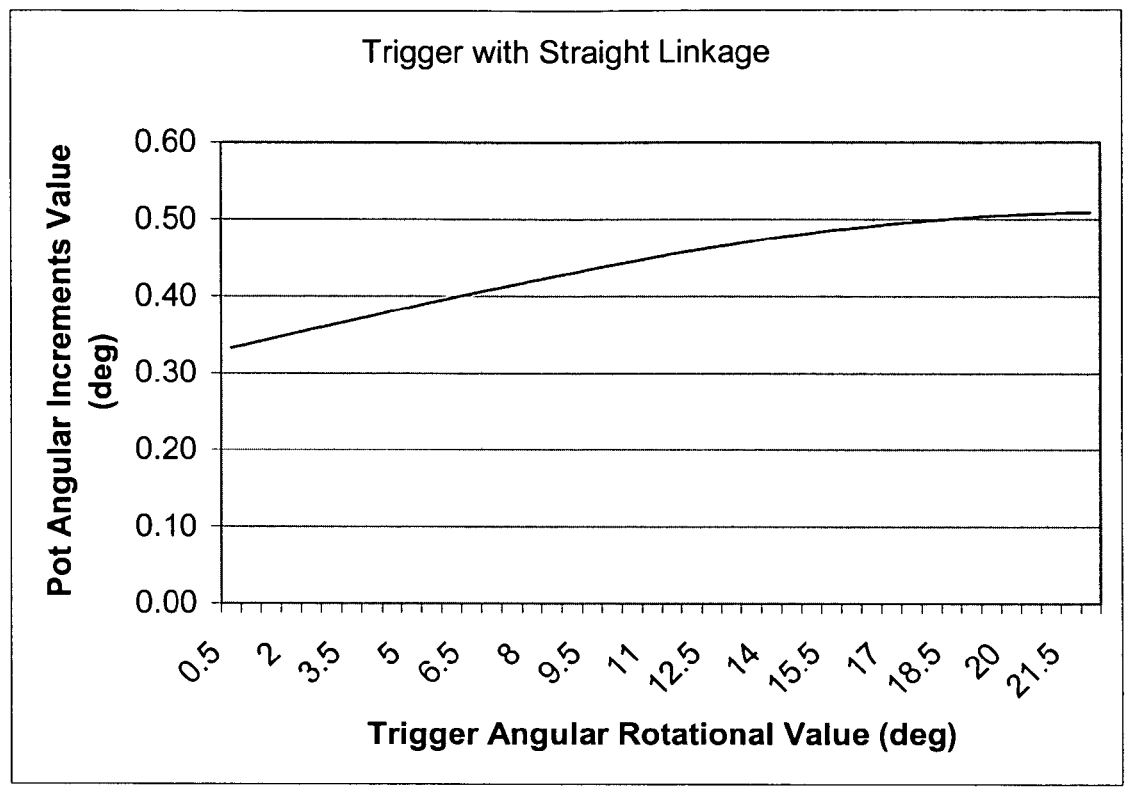
FIG. 8 graphs the incremental potentiometer rotation angle PA°, for the straight link mechanism of FIG. 7, relative to each 0.5° incremental increase in trigger rotation angle TA°.

FIG. 8 graphs the incremental potentiometer rotation angle PA°, for the straight link mechanism configuration of FIG. 7, relative to each 0.5° incremental increase in trigger rotation angle TA°. Ideally, if linearity were to exist, the graph would be a straight, horizontal line at 0.50 on the y-axis.

FIG. 9 graphs total potentiometer rotation angle PA°, for the straight link mechanism configuration of FIG. 7, relative to total trigger rotation angle TA°. Ideally, if linearity were to exist, the graph would show a straight line, with a one to one relationship between x-axis and y-axis values.

Figure 10:
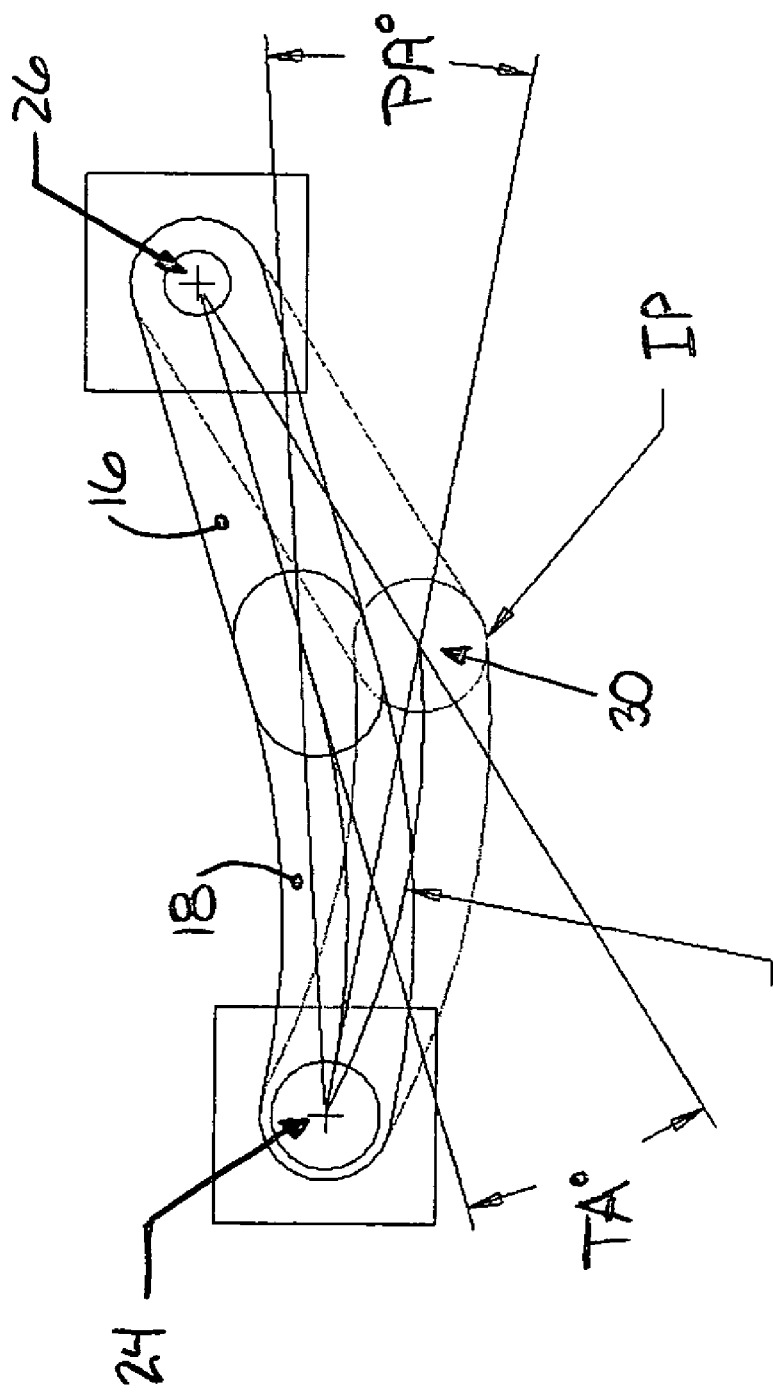
FIG. 10 illustrates a relationship between trigger rotation angle TA° and potentiometer rotation angle PA° using a link mechanism in accordance the embodiment of the present invention shown in FIGS. 1-4.

FIG. 10 illustrates a relationship between trigger rotation angle TA° and potentiometer rotation angle PA° using the link mechanism 18 embodiment of the present invention shown in FIGS. 1-4. The FIG. 10 embodiment has curvature over a portion of the length of the link mechanism 18, and has a slot 28 that is both angled and curved. The radius of curvature of the slot 28 is 40 mm, with radius center located above the slot 28. The slot 28 is also angled 2.5° above horizontal. Further, a line drawn through the slot end center-points (slot center line CL) of the FIG. 10 embodiment does not intersect the link mechanism pivot point 24. In FIG. 10, an initial position IP of the components, where the trigger 16 is spring-biased in a disengaged position, is shown in lighter print. As the trigger 16 is engaged and rotated clockwise about the trigger pivot point 26, increments of trigger rotation angle TA° are recorded versus resulting potentiometer rotation angle PA°.

Table 2 charts the relationship of incremental trigger rotation angle TA° versus resulting potentiometer rotation angle PA° for the embodiment of the present invention shown in FIG. 10. For purposes of comparison, the values of link distance LD, trigger distance TD, horizontal offset HO and vertical offset VO, in this embodiment, are identical to those in the straight link mechanism example of FIG. 7. That is, the link distance LD is 19.56 mm, the horizontal offset HO is 38.30 mm, and the vertical offset VO is 6.04 mm. As in the straight linkage example, the link distance LD is not equal to the trigger distance TD. Table 2 shows that for every 0.5° increment of trigger rotation angle TA°, the resulting increment of potentiometer rotation angle PA° ranges between 0.42° and 0.51°.

Figure 12:
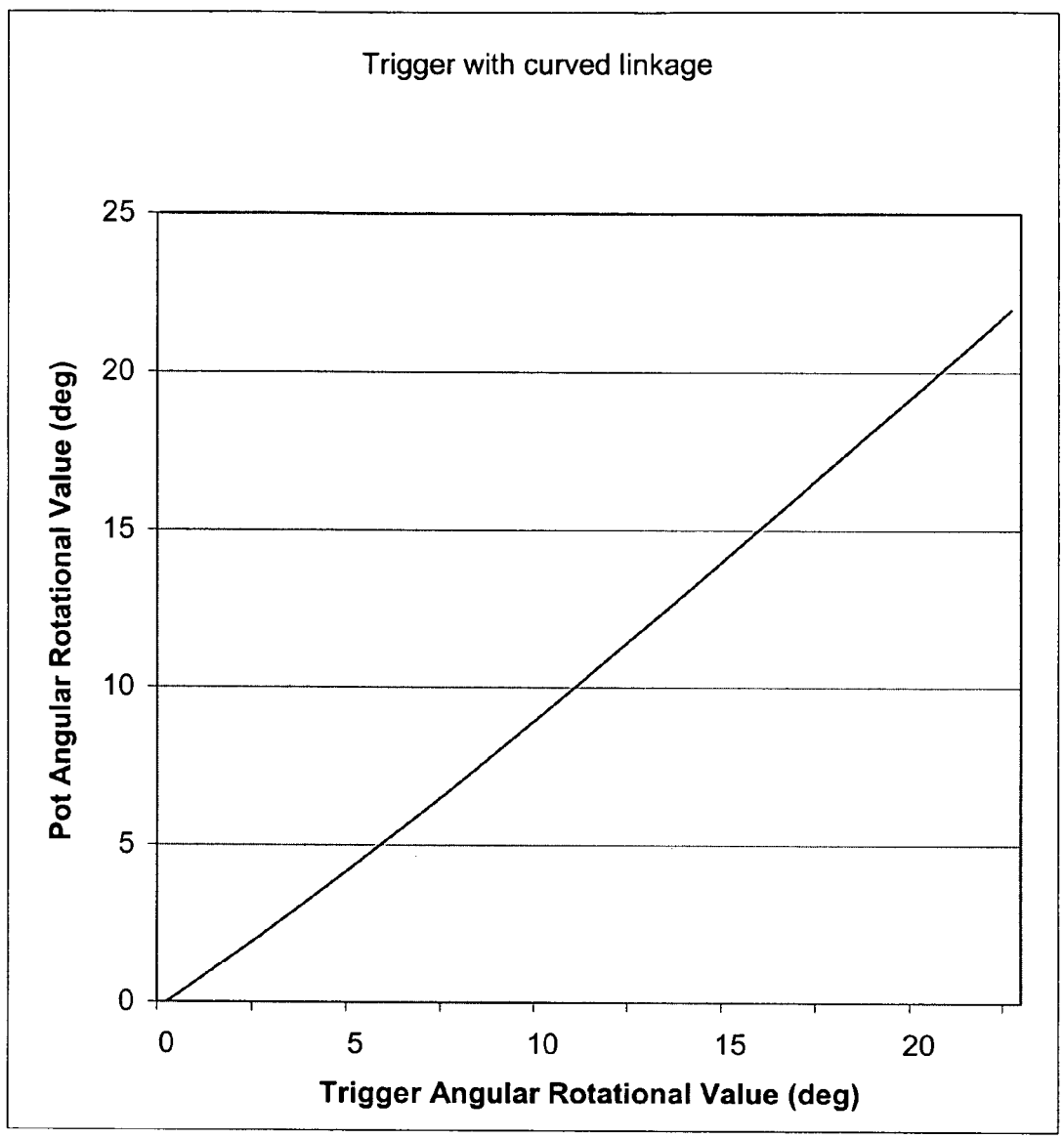
FIG. 12 graphs total potentiometer rotation angle PA°, for the FIGS. 1-4 embodiment of the present invention, relative to total trigger rotation angle TA°.

Table 2 illustrates that the curved link mechanism of the present invention, as shown in FIG. 10 (and as shown in FIGS. 1-4) reduces the angular discrepancy error between trigger rotation angle TA° and potentiometer rotation angle PA° to +/−2.2%. The resulting relationship between user input (when a user depresses the trigger) and game response (angular movement of the potentiometer axle) involves and benefits from a higher degree of linearity than in the straight linkage example, as illustrated in FIG. 12. For example, with the FIG. 10 embodiment of the present invention, a 22° turn of the trigger produces a 21.5° turn of the potentiometer axle, rather than a 19.4° turn of the potentiometer axle (as in the straight linkage example of FIG. 7).

Figure 11:
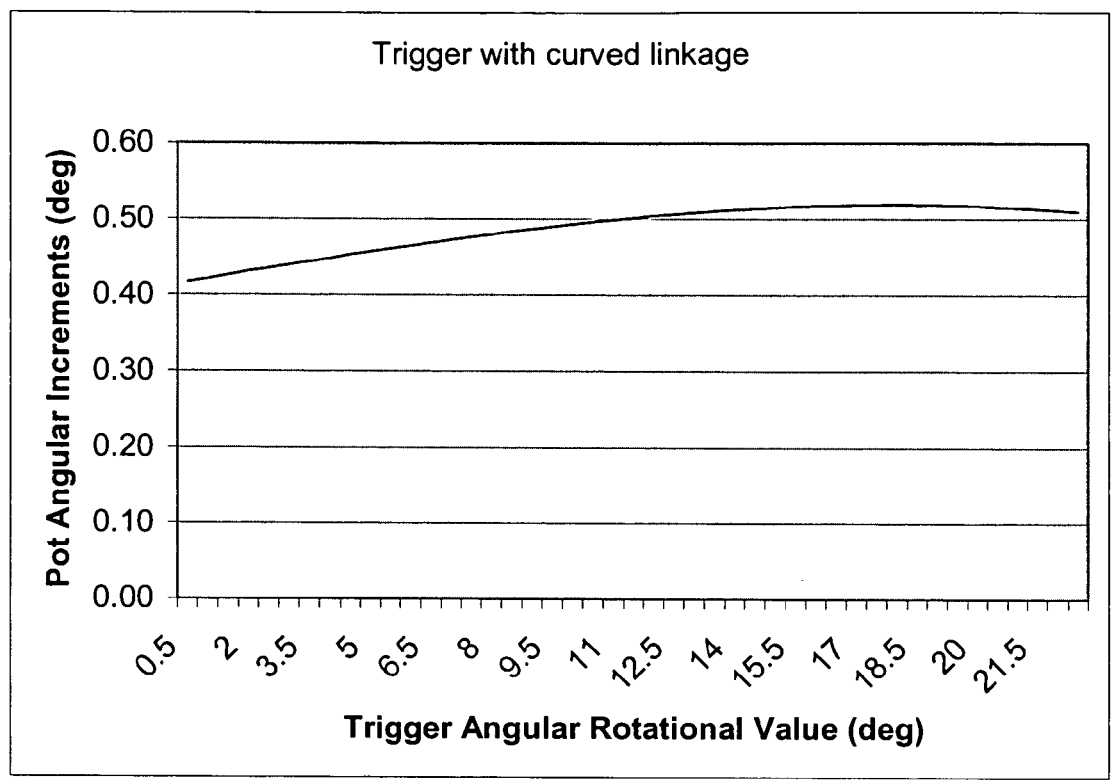
FIG. 11 graphs the incremental potentiometer rotation angle PA°, for the FIGS. 1-4 embodiment of the present invention, relative to each 0.5° incremental increase in trigger rotation angle TA°.

FIG. 11 graphs the incremental potentiometer rotation angle PA°, for the FIG. 10 embodiment of the present invention, relative to each 0.5° incremental increase in trigger rotation angle TA°. As shown in FIG. 11, the graph represents a much higher degree of linearity.

FIG. 12 graphs total potentiometer rotation angle PA°, for the FIG. 10 embodiment, relative to total trigger rotation angle TA°. Again, the graph illustrates a higher degree of linearity, with a much closer to one to one relationship existing between the x-axis and y-axis values.

These and other advantages of the present invention will be apparent to those skilled in the art from the foregoing specification. Accordingly, it will be recognized by those skilled in the art that changes or modifications may be made to the above-described embodiments without departing from the broad inventive concepts of the invention. For example, use of the link mechanism of the present invention is not limited to video game controllers, but rather the several embodiments of the invention could provide a higher degree of linearity of rotational movement between any two rotationally interacting mechanisms located a distance apart. It should therefore be understood that this invention is not limited to the particular embodiments described herein, but is intended to include all changes and modifications that are within the scope and spirit of the invention.

TABLE 1

Trigger with straight linkage

| constants | Trigger Angular increments to initial (deg) 0.5 | Trigger Shaft Length 19.56 | Pot distance to trigger pivot - X direction 38.30 | Pot distance to trigger pivot - Y direction 6.04 | Pot Angular increments | Pot Angular increments to initial |
|---|---|---|---|---|---|---|
| initial value | 0 | | | | 0 | 0 |
| | 0.5 | | | | 0.33 | 0.33 |
| | 1 | | | | 0.34 | 0.67 |
| | 1.5 | | | | 0.34 | 1.01 |
| | 2 | | | | 0.35 | 1.37 |
| | 2.5 | | | | 0.36 | 1.72 |
| | 3 | | | | 0.36 | 2.08 |
| | 3.5 | | | | 0.37 | 2.45 |
| | 4 | | | | 0.37 | 2.83 |
| | 4.5 | | | | 0.38 | 3.21 |
| | 5 | | | | 0.39 | 3.59 |
| | 5.5 | | | | 0.39 | 3.98 |
| | 6 | | | | 0.40 | 4.38 |
| | 6.5 | | | | 0.40 | 4.78 |
| | 7 | | | | 0.41 | 5.19 |
| | 7.5 | | | | 0.41 | 5.61 |
| | 8 | | | | 0.42 | 6.03 |
| | 8.5 | | | | 0.42 | 6.45 |
| | 9 | | | | 0.43 | 6.88 |
| | 9.5 | | | | 0.44 | 7.32 |
| | 10 | | | | 0.44 | 7.76 |
| | 10.5 | | | | 0.44 | 8.20 |
| | 11 | | | | 0.45 | 8.65 |
| | 11.5 | | | | 0.45 | 9.10 |
| | 12 | | | | 0.46 | 9.56 |
| | 12.5 | | | | 0.46 | 10.03 |
| | 13 | | | | 0.47 | 10.49 |
| | 13.5 | | | | 0.47 | 10.96 |
| | 14 | | | | 0.47 | 11.44 |
| | 14.5 | | | | 0.48 | 11.92 |
| | 15 | | | | 0.48 | 12.40 |
| | 15.5 | | | | 0.49 | 12.89 |
| | 16 | | | | 0.49 | 13.37 |
| | 16.5 | | | | 0.49 | 13.86 |
| | 17 | | | | 0.49 | 14.36 |
| | 17.5 | | | | 0.50 | 14.86 |
| | 18 | | | | 0.50 | 15.35 |
| | 18.5 | | | | 0.50 | 15.86 |
| | 19 | | | | 0.50 | 16.36 |
| | 19.5 | | | | 0.50 | 16.86 |

TABLE 1-continued

Trigger with straight linkage

| constants | Trigger Angular increments to initial (deg) 0.5 | Trigger Shaft Length 19.56 | Pot distance to trigger pivot - X direction 38.30 | Pot distance to trigger pivot - Y direction 6.04 | Pot Angular increments | Pot Angular increments to initial |
|---|---|---|---|---|---|---|
| | 20 | | | | 0.51 | 17.37 |
| | 20.5 | | | | 0.51 | 17.87 |
| | 21 | | | | 0.51 | 18.38 |
| | 21.5 | | | | 0.51 | 18.89 |
| | 22 | | | | 0.51 | 19.40 |
| | 22.5 | | | | 0.51 | 19.91 |

TABLE 2

Trigger with curved linkage

| constants | Trigger Angular increments to initial (deg) 0.5 | Trigger Shaft Length 19.56 | Pot distance to trigger pivot - X direction 38.30 | Pot distance to trigger pivot - Y direction 6.04 | Linkage Radius 40.00 | Pot Angular increments | Pot Angular increments to initial |
|---|---|---|---|---|---|---|---|
| initial value | 0 | | | | | 0 | 0.0 |
| | 0.5 | | | | | 0.42 | 0.4 |
| | 1 | | | | | 0.42 | 0.8 |
| | 1.5 | | | | | 0.43 | 1.3 |
| | 2 | | | | | 0.43 | 1.7 |
| | 2.5 | | | | | 0.44 | 2.1 |
| | 3 | | | | | 0.44 | 2.6 |
| | 3.5 | | | | | 0.44 | 3.0 |
| | 4 | | | | | 0.45 | 3.5 |
| | 4.5 | | | | | 0.45 | 3.9 |
| | 5 | | | | | 0.46 | 4.4 |
| | 5.5 | | | | | 0.46 | 4.8 |
| | 6 | | | | | 0.46 | 5.3 |
| | 6.5 | | | | | 0.47 | 5.8 |
| | 7 | | | | | 0.47 | 6.2 |
| | 7.5 | | | | | 0.48 | 6.7 |
| | 8 | | | | | 0.48 | 7.2 |
| | 8.5 | | | | | 0.48 | 7.7 |
| | 9 | | | | | 0.49 | 8.2 |
| | 9.5 | | | | | 0.49 | 8.7 |
| | 10 | | | | | 0.49 | 9.1 |
| | 10.5 | | | | | 0.50 | 9.6 |
| | 11 | | | | | 0.50 | 10.1 |
| | 11.5 | | | | | 0.50 | 10.6 |
| | 12 | | | | | 0.50 | 11.2 |
| | 12.5 | | | | | 0.51 | 11.7 |
| | 13 | | | | | 0.51 | 12.2 |
| | 13.5 | | | | | 0.51 | 12.7 |
| | 14 | | | | | 0.51 | 13.2 |
| | 14.5 | | | | | 0.51 | 13.7 |
| | 15 | | | | | 0.52 | 14.2 |
| | 15.5 | | | | | 0.52 | 14.7 |
| | 16 | | | | | 0.52 | 15.3 |
| | 16.5 | | | | | 0.52 | 15.8 |
| | 17 | | | | | 0.52 | 16.3 |
| | 17.5 | | | | | 0.52 | 16.8 |
| | 18 | | | | | 0.52 | 17.3 |
| | 18.5 | | | | | 0.52 | 17.8 |
| | 19 | | | | | 0.52 | 18.4 |
| | 19.5 | | | | | 0.52 | 18.9 |
| | 20 | | | | | 0.52 | 19.4 |
| | 20.5 | | | | | 0.52 | 19.9 |
| | 21 | | | | | 0.52 | 20.4 |
| | 21.5 | | | | | 0.51 | 20.9 |
| | 22 | | | | | 0.51 | 21.5 |
| | 22.5 | | | | | 0.51 | 22.0 |

What is claimed:

1. A game controller comprising:
   a mount member;
   a trigger member hingedly mounted to the mount member to enable rotation of the trigger member about a trigger pivot point in response to user manipulation of the trigger member;
   an analogue input device comprising a rotatable control member coupled to the mount member; and
   a link member, which is coupled to the trigger member and the rotatable control member and operatively mounted to pivot about a link pivot point in response to user manipulation of the trigger member, to translate a rotation of the trigger member about the trigger pivot point to a rotation of the rotatable control member, wherein:
      the link member is operatively coupled to the trigger member by a post member that slidably engages a slot to enable translation of the rotation of the trigger member about the trigger pivot point to the rotation of the rotatable control member;
      a longitudinal axis of the slot does not intersect the trigger pivot point or the link pivot point; and
      the rotatable control member of the analogue input device is an elongated rotatable shaft that is aligned with an axis of rotation of the link member which intersects the link pivot point.

2. The game controller of claim 1, wherein the slot is an element of the link member and the post is an element of the trigger member that extends from the trigger member.

3. The game controller of claim 1, wherein a length of the link member is curved over at least a portion thereof.

4. The game controller of claim 1, wherein the slot is curved to facilitate linearity or near linearity of the translation of the rotation of the trigger member and the rotation of the rotatable control member.

5. The game controller of claim 4, wherein a radius of the curved slot is centered above the link member and the slot is curved about the radius over an entirety of the slot.

6. The game controller of claim 1, wherein an angle other than 0° exists between a longitudinal axis of the slot and any line parallel to a line intersecting the link pivot point and forming a 90° angle with a line intersecting the trigger pivot point, whereby the angled slot facilitates linearity or near linearity of the translation of the rotation of the trigger member and rotation of the rotatable control member.

7. The game controller of claim 6, wherein the angle between the longitudinal axis of the slot and any line parallel to a line intersecting the link pivot point and forming a 90° angle with a line intersecting the trigger pivot point equals an angle between the line intersecting the link pivot point and forming a 90° angle with a line intersecting the trigger pivot point and a line intersecting the trigger pivot point and the link pivot point.

8. The game controller of claim 7, wherein the slot is additionally curved about a radius to further facilitate linearity or near linearity of the translation of the rotation of the trigger member and the rotation of the rotatable control member.

9. The game controller of claim 1, wherein a distance between the trigger pivot point and the post equals a distance between the post and the link pivot point.

10. The game controller of claim 1, wherein the trigger pivot point is vertically offset from the link pivot point.

11. The game controller of claim 1, wherein the post is vertically offset from each of the trigger pivot point and the link pivot point.

12. A game controller comprising:
   a trigger member that can be pulled by a finger of a user, the trigger member being hingedly mounted on the controller to enable rotation of the trigger member about a trigger pivot point;
   an analogue input device; and
   a link mechanism, which is operatively mounted to rotate about a link pivot point in response to user manipulation of the trigger member, for communicating a rotational movement of the trigger member to operation of the analogue input device through a joint mechanism which comprises a post that slidably engages a curved slot slidably coupled to the link mechanism and trigger member, wherein:
      a longitudinal axis of the slot does not intersect the trigger pivot point or the link pivot point; and
      a rotatable control member of the analogue input device is an elongated rotatable shaft that is aligned with an axis of rotation of the link mechanism which intersects the link pivot point.

13. The game controller of claim 12, wherein a line defined by center-points of ends of the slot does not intersect the link pivot point or the trigger pivot point.

* * * * *